United States Patent [19]

Graven et al.

[11] Patent Number: 4,681,674

[45] Date of Patent: Jul. 21, 1987

[54] FIXED BED CATALYTIC REACTOR SYSTEM WITH IMPROVED LIQUID DISTRIBUTION

[75] Inventors: Richard G. Graven, Pennington; John C. Zahner, Princeton, both of N.J.

[73] Assignee: Mobil Oil Corporation, New York, N.Y.

[21] Appl. No.: 795,816

[22] Filed: Nov. 7, 1985

[51] Int. Cl.$^4$ .............................................. C10G 65/02
[52] U.S. Cl. ........................................ 208/59; 208/18; 208/169; 208/DIG. 1; 208/111
[58] Field of Search ................. 208/59, 169, 168, 166, 208/DIG. 1, 18, 111

[56] References Cited

U.S. PATENT DOCUMENTS

| | | | |
|---|---|---|---|
| 2,826,601 | 3/1958 | Barsky | 203/DIG. 6 |
| 3,600,299 | 8/1971 | Koller | 208/59 |
| 3,607,091 | 9/1971 | Boyd | 208/59 |
| 3,652,451 | 3/1972 | Boyd | 208/59 |
| 3,723,300 | 3/1973 | Carson et al. | 208/59 |
| 3,726,787 | 4/1973 | Frazier et al. | 208/59 |
| 3,728,249 | 4/1973 | Antezana et al. | 208/57 |
| 3,891,539 | 6/1975 | Nelson et al. | 208/59 |
| 3,983,029 | 9/1976 | White | 208/59 |
| 4,191,632 | 3/1980 | Cosyns et al. | 208/59 |
| 4,213,847 | 7/1980 | Chen et al. | 208/DIG. 6 |
| 4,239,614 | 12/1980 | Hutchings | 208/59 |
| 4,313,817 | 2/1982 | Mayer et al. | 208/89 |
| 4,430,203 | 2/1984 | Cash | 208/59 |
| 4,471,147 | 9/1984 | Owen et al. | 585/519 |

*Primary Examiner*—Andrew H. Metz
*Assistant Examiner*—Anthony McFarlane
*Attorney, Agent, or Firm*—Alexander J. McKillop; Michael G. Gilman; L. G. Wise

[57] ABSTRACT

A continuous process and system is provided for a petroleum oil in a multi-phase fixed bed catalytic reactor column comprising methods and means for:

feeding the oil and a reactant gas at production flow rates above a first bed of porous solid catalyst particles under conversion conditions for cocurrent downward flow therethrough, collecting and withdrawing the treated oil from the first bed and redistributing at least a portion of the treated oil to at least one succeeding catalyst bed while permitting the gaseous phase to flow directly to the succeeding lower catalyst bed, recycling a quantity of treated oil collected below a catalyst bed and reapplying the treated oil at a preceding redistribution zone above the bed from which treated oil is collected, whereby the total of oil production flow rate and recycled treated oil flow rate is maintained at a predetermined minimum sufficient to effect uniform catalyst wetting. This technique is useful for hydrodewaxing of oils over zeolite catalysts.

6 Claims, 3 Drawing Figures

FIXED BED CATALYTIC REACTOR SYSTEM WITH IMPROVED LIQUID DISTRIBUTION

BACKGROUND OF THE INVENTION

This invention relates to catalytic reactor operating techniques wherein a liquid phase reactor is co-treated with a gaseous phase reactant. In particular, it relates to an improvement for contacting multi-phase reactants in a fixed porous catalyst bed under continuous operating conditions, including methods and apparatus for controlling fluid flow in the reactor.

Chemical reactions between liquid and gaseous reactants present difficulties in obtaining intimate contact between phases. Such reactions are further complicated when the desired reaction is catalytic and requires contact of both fluid phases with a solid catalyst. In the operation of conventional concurrent multiphase reactors, the gas and liquid under certain circumstances tend to travel different flow paths. The gas phase can flow in the direction of least pressure resistance; whereas the liquid phase flows by gravity in a trickle path over and around the catalyst particles. Parallel channel flow and gas frictional drag can make the liquid flow non-uniformly, thus leaving portions of the catalyst bed underutilized due to lack of adequate wetting.

Various attempts have been made to avoid maldistribution, such as the provision of multiple layers of catalyst with interlayered redistributors located along the reactor longitudinal axis. Numerous multi-phase reactor systems have been developed wherein a fixed porous bed of solid catalyst is retained in a reactor. Typically, fixed bed reactors have been arranged with the diverse phases being passed concurrently over the catalyst, for instance as shown in U.S. Pat. Nos. 4,126,539 (Derr et al), 4,235,847 (Scott), 4,283,271 (Garwood et al), and 4,396,538 (Chen et al). While prior reactor systems are satisfactory for certain needs, efficient multi-phase contact has been difficult to achieve for many fixed bed applications.

In the petroleum refining industry, multi-phase catalytic reactor systems have been employed for dewaxing, hydrogenation, desulfurizing, hydrocracking, isomerization and other treatments of liquid feedstocks, especially heavy distillates, lubricants, heavy oil fractions, residuum, etc,. In a preferred hydrodewaxing process the catalyst comprises a medium pore siliceous zeolite having a constraint index of about 1 to 12, for example, an acidic ZSM-5 type pentasil aluminosilicate having a silica to alumina mole ratio greater than 12. It is an object of the present invention to provide a unique reactor system, including concurrent operating techniques and apparatus, for improved treatment of liquid with a gaseous reactant in a reactor containing a porous fixed bed of solid catalyst. It is a further object to provide a technique for operating multi-phase reactors under controlled flow conditions to maintain substantially uniform gas-liquid contact, while minimizing flow and temperature maldistribution patterns and providing downwardly gravitating liquid under substantially uniform liquid flux to assure relatively uniform wetting of the catalyst particles.

SUMMARY OF THE INVENTION

A continuous process has been devised for multiphase catalysis. This technique is particularly useful for hydrodewaxing a wax-containing lubricant range petroleum oil in a multi-phase fixed bed catalytic reactor system having at least two catalyst beds. The invention comprises the steps of feeding the oil and hydrogen-containing gas at production flow rates above a first horizontal porous bed of acid hydrodewaxing catalyst particles at elevated temperature under hydrodewaxing conditions for concurrent downward flow therethrough; collecting and withdrawing the treated oil from the first bed and redistributing at least a portion of the treated oil to at least one succeeding horizontal porous catalyst bed of acid hydrodewaxing catalyst particles while permitting the gaseous phase to flow directly to the succeeding lower catalyst bed; recycling a quantity of treated oil collected below a catalyst bed; and reapplying the treated oil at a preceding redistribution zone above the bed from which treated oil is collected; whereby the total of oil feed rate and recycled treated oil flow rate is maintained at a sufficient liquid flux rate sufficient to provide catalyst wetting. Process control can be maintained by measuring the rate of oil feed, comparing the oil feed rate with a predetermined total design flow rate, and increasing recycle of treated oil in at least one bed.

These and other features and advantages of the invention will be seen in the following description and drawing.

THE DRAWING

DESCRIPTION OF PREFERRED EMBODIMENTS

Figure 1:
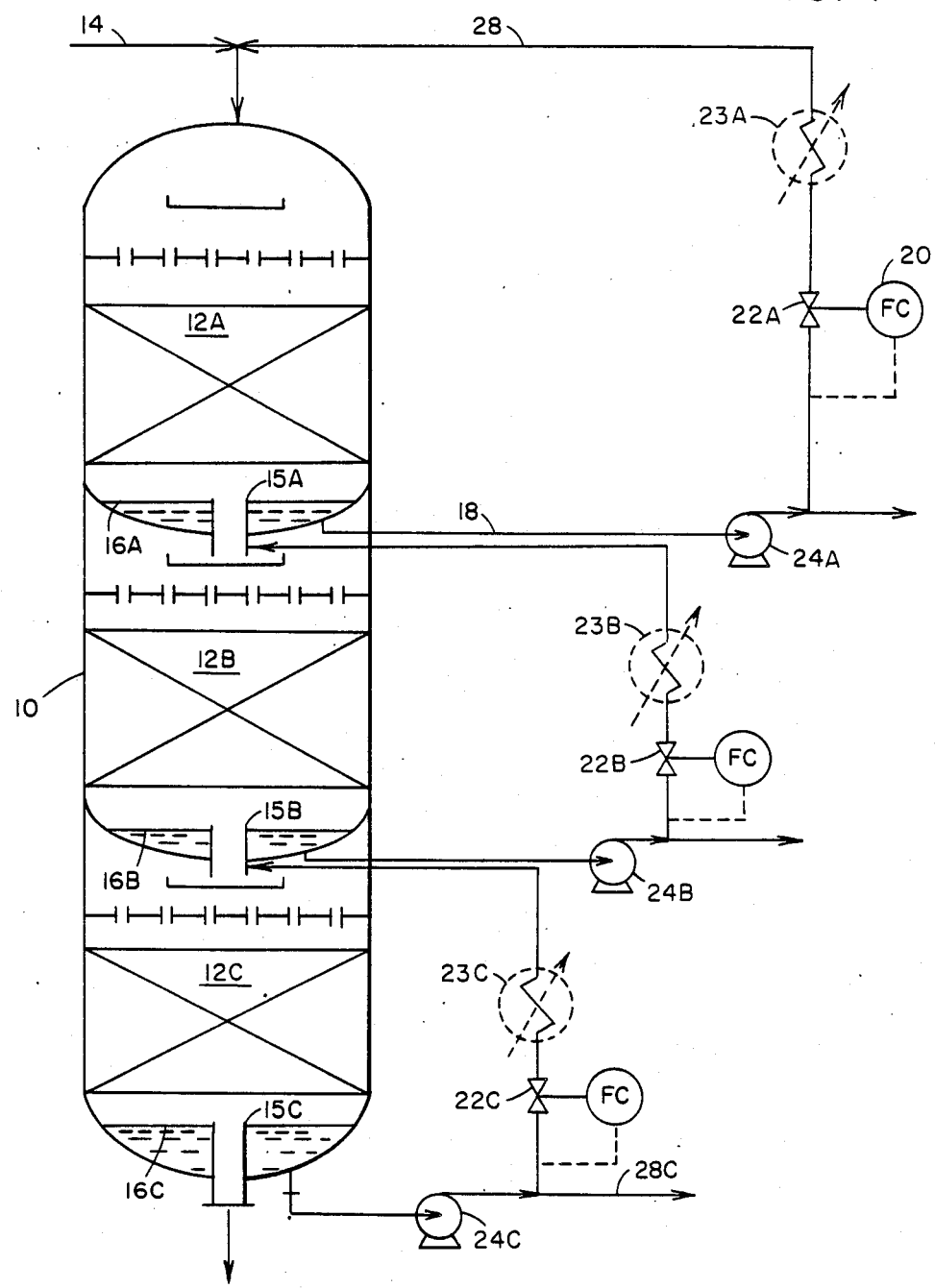
FIG. 1 is a simplified process diagram showing a vertical reactor with fixed catalyst beds, showing major flow streams and distribution equipment.

The reactor system is depicted schematically in FIG. 1, with the main fluid conduits shown in solid line and control interface signal means in dashed line. A vertical reactor shell 10 is fabricated to enclose and support a stacked series of fixed porous solid catalyst beds 12A, B, C. A mixed feed, comprising liquid oil and gaseous reactants, is introduced via upper inlet means 14. Some of the liquid phase is collected and can be withdrawn via conduit 18 under control of a flow controller (FC) 20 and its associated control valve 22. The withdrawn liquid is circulated by pump 24 and returns to the top of the reactor vessel 10 via conduit 28 for admixture with feedstream 14. Uniform distribution of liquid and vapor to the catalyst bed is obtained by a suitable distributor tray system well known in the art. Alternatively conduit 18 could connect to an internal liquid spray header distributor as a means for distributing recycle liquid over the catalyst bed. Typically, the liquid and gas phases are introduced into the reactor at a desired pressure and temperature; however, it is feasible to adjust the liquid temperature of heat exchange in the external flow loop, thereby allowing independent control of the temperature in any catalyst bed if this should be desirable.

Partially converted liquid and gas flow downwardly from the initial catalyst contact zone 12A through conduit 15A into the next catalyst zone. Conduit 15A is positioned so liquid collects in an internal head 16A and overflows into conduit 15A. Partially converted liquid and vapor are distributed to catalyst bed 12B by conventional means. Flow controller 20 can be adjusted to change recycle rate so a substantially uniform liquid flux to an individual catalyst bed can be achieved under varying feed rates if this is desirable.

The operation of the succeeding stages is similar to that described in the initial conversion stage, with corresponding numbered elements being designated by letters A, B, C according to the association with beds 12A, 12B, 12C. Optional heat exchangers 23A, B, C permit the temperature of each recycle stream to be controlled independently. This technique provides thermal control of each catalyst bed section, and permits interstage sampling to determine the degree of conversion achieved in each bed.

Figure 2:
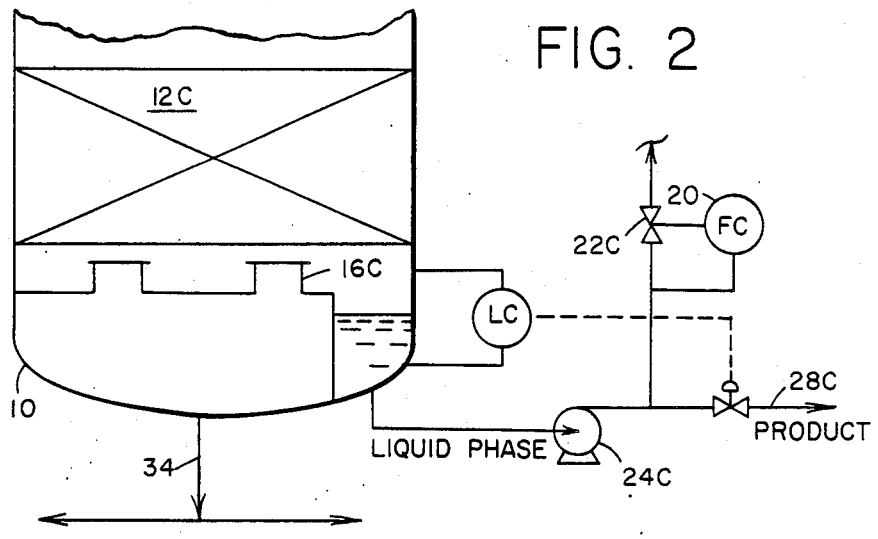
FIG. 2 is a vertical cross-section view of a reactor portion showing a preferred liquid recycle technique.

An alternate design of the reactor outlet is shown on FIG. 2. With this design the fluid from final bed 12C may be separated by baffled runoff means 16C to collect the depleted reactant gas from reactor vessel 10 through bottom gas outlet means 34. This design allows the reactor effluent to be separated into a liquid reactor effluent for product recovery and a hydrogen rich vapor reactor effluent. Since the vapor phase effluent is high in hydrogen content (i.e. 70 to 90 mol%, depending upon heaviness and degree conversion of feedstock), there may be some situations where it could be economic to recycle the hot vapor back to the upper reactor inlet to increase hydrogen circulation and partial pressure. This would probably require a smaller compressor than recycling cold gas from a conventional ambient temperature separate and would improve process thermal efficiency. This feature may apply to lubricant hydrodewaxing, hydrocracking, or residuum hydrotreating.

Treated liquid from the final bed 12C may be recovered via product conduit 28C or diverted for recirculation according to need by valve 22C operatively connected to its section flux control system.

A continuous three-stage reactor column has been described for contacting gas and liquid phases with a series of porous catalyst beds; however, it may be desired to have two, four or more beds. The catalyst composition may be the same in all beds; however, it is within the inventive concept to have different catalysts and reaction conditions in the separated beds. A typical vertical reactor vessel has top inlet means for feeding gas and liquid reactant streams and bottom product recovery means. The vessel will have at least two vertically-spaced porous catalyst beds supported in the reactor shell for contacting gas and liquid reactants in concurrent flow and top distributor means for applying liquid and gas and uniformly over the top bed cross section. At least one interbed redistributor means will comprise a gravity flow liquid collection reservoir, means for withdrawing liquid, and liquid recirculation means including flow control means for passing a predetermined portion (say 0-50%) of liquid from the collection reservoir to at least one catalyst bed above the interbed redistributor means. A distributor plate having gas-liquid downcomer means passing therethrough is a suitable design.

Figure 3:
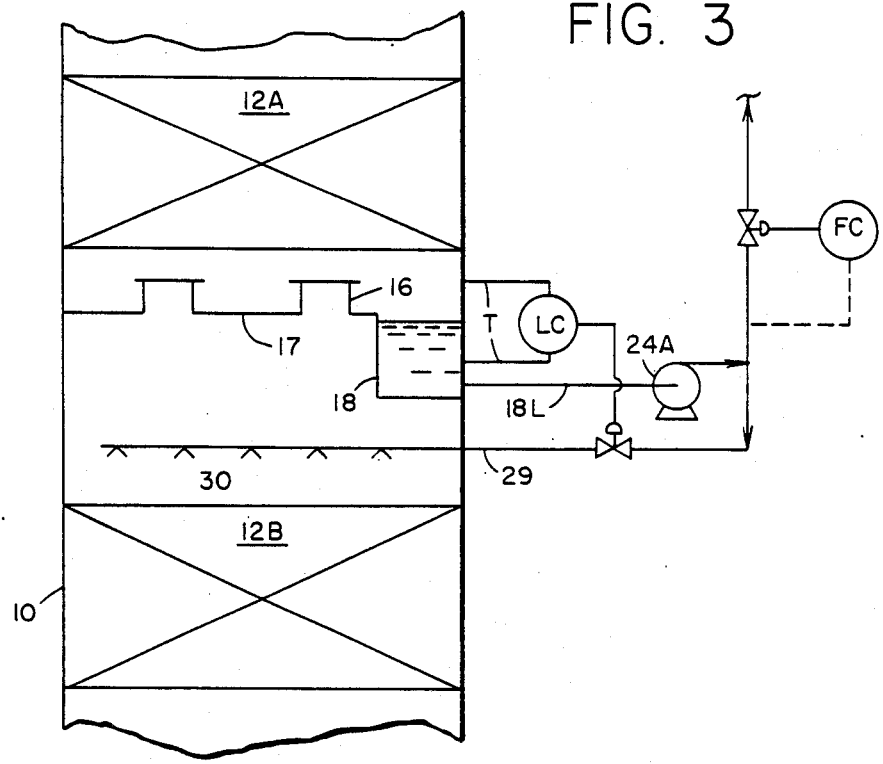
FIG. 3 is a vertical cross section of an interstage reactor portion showing an alternative fluid handling means.

FIG. 3 is a vertical cross section view of the reactor showing an interstage segment. The typical interstage reactor section comprises a cylindrical metal shell 10 having catalyst beds 12A, 12B adapted to receive gas and liquid from the above bed and pass this effluent mixture to the baffled phase separator means 16. Liquid is collected from a horizontal collector plate 17 and runs across this plate to a runoff liquid collection reservoir means 18. Liquid level may be sensed at this point via pressure taps T operative connected to the corresponding level control (LC). Outlet port 18L permits liquid to be withdrawn for circulation. This liquid, combined with the diverted flow from the succeeding stage is introduced for recirculation via conduit 29.

Liquid distribution is achieved by any conventional technique, such as distributor trays or spray headers 30, which projects the liquid onto the lower bed surface 12B at spaced points. A layer of porous balls, screen or perforated plate may be employed to facilitate uniform distribution. The liquid phase again contacts reactant gas, which passed through the baffle means via vapor hats in a known manner.

The reactor system can be provided with liquid level control means responsive to liquid level in the collection reservoir, and recirculation flow control means for recirculating liquid from the collection reservoir at an inverse rate to liquid feed entering the reactor column top inlet means, thereby maintaining a substantially constant total liquid flux rate in the catalyst bed above the interbed redistribution means under varying liquid feed rates.

In a preferred mode of flow control useful with this novel system, the volume of material recycled back to the top of a particular catalyst bed can be varied or the total recycle flow can be maintained constant. In this manner, flows to the spray headers may be fixed by the operator, while the volume of liquid recycled is automatically varied. Alternatively, diverter conduit flow can be used for measuring and controlling total flow.

While either mode of control may be acceptable, specific applications will determine the preferable mode of control. With the use of a process control computer to send and receive signals from all flow measuring points, switching from the various mode of control can be effected. A suitable control system may include means for generating a first signal representative of liquid feed rate to the reactor inlet, flow sensor means for generating a second signal representative of liquid recirculation rate, the recirculation control means having means for adding the first and second signals and controlling the liquid recirculation rate to provide the total liquid flux rate. The control system can measure the production rate of the oil feed, compare the production rate with a predetermined total design flow rate, and increase recycle of treated oil in at least one bed so that the total of the production rate and recycle rate is maintained substantially equal to a predetermined design bed flux rate.

The present technique is adaptable to a variety of interphase catalytic reactions, particularly for treatment of heavy oils with hydrogen-containing gas at elevated temperature. Industrial processes employing hydrogen, especially petroleum refining, employ recycled impure gas containing 10 to 50 mol % or more of impurities, usually light hydrocarbons and nitrogen. Such reactant gases are available and useful herein, especially for high temperature hydrocracking and/or hydrogenolysis at superatmospheric pressure.

In the refining of lubricants derived from petroleum by fractionation of crude oil, a series of catalytic reactions are employed to severely hydrotreat, convert and remove sulfur and nitrogen contaminants, hydrocracking and isomerizing components of the lubricant charge stock in one or more catalytic reactors. This can be followed by hydrodewaxing and/or hydrogenation (mild hydrotreating) in contact with different catalysts under varying reaction conditions. An integrated three-step lube refining process disclosed by Garwood et al, in U.S. Pat. No. 4,283,271 is adaptable according to the present invention.

In a typical multi-phase reactor system, the average gas-liquid volume ratio in the catalyst zone is about 1:4 to 20:1 under process conditions. Preferrably the liquid is supplied to the catalyst bed at a rate to occupy about 10 to 50% of the void volume. The volume of gas may decrease due to reactant depletion, as the liquid feedstock and gas pass through the reactor. Vapor production, adiabatic heating or expansion can also affect the volume.

Advantageously, the multi-phase reactor system is operated to achieve uniform distribution and substantially constant liquid flux. If too little liquid flux is maintained, the catalyst surface in the porous bed may become dry or permit excessive channeling of the gas phase. Flow rates for both reactant phases are controlled within constraints, whereby proper operation of the reactor can be assured.

Advantageously, the catalyst bed has a void volume fraction greater than 0.25. Void fractions from 0.3 to 0.9 can be achieved using loosely packed polylobal or cylindrical extrudates, providing adequate liquid flow rate component for uniformly wetting catalyst to enhance mass transfer and catalytic phenomena.

Catalyst size can vary widely within the inventive concept, depending upon process conditions and reactor structure. If a low space velocity or long residence in the catalytic reaction zone is permissible, catalysts having an average maximum dimension of 1 to 5 mm may be employed.

Reactor configuration is an important consideration in the design of a continuously operating system. In its simplest form, a vertical pressure vessel is provided with a series of stacked catalyst beds of uniform cross-section. A typical vertical reactor having a total catalyst bed length to average width (L/D aspect) ratio of about 2:1 to 20:1 is preferred. Stacked series of beds may be retained within the same reactor shell. Reactors of uniform horizontal cross section are preferred; however, non-uniform configurations may also be employed, with appropriate adjustments in the bed flux rate and corresponding recycle rates.

A preferred process herein is a catalytic hydrodewaxing process employing heavy petroleum gas oil lubricant feedstock at a liquid space velocity of about 1 hr$^{-1}$ over randomly packed beds of 1.5 mm extrudate catalyst of the ZSM-5 type zeolite catalyst having a porosity (apparent void volume fraction) of 0.35 to 0.4. The hydrocarbon oil has a viscosity of 0.1 to 1 centipoise. The reactant gas is fed at a uniform rate of std. m$^3$/barrel of oil. While the invention has been explained by reference to preferred embodiments, there is no intent to limit the inventive concept, except as set forth in the following claims.

What is claimed is:

1. A continuous process for treating a wax-containing petroleum oil in a multi-phase fixed bed catalytic hydrodewaxing reactor system comprising the steps of feeding the oil and a reactant gas containing hydrogen at feed flow rates above a first bed of porous zeolite hydrodewaxing catalyst particles under hydrodewaxing conversion conditions for concurrent downward flow therethrough;

collecting and withdrawing the treated oil from the first bed and redistributing at least a portion of the treated oil to at least one succeeding catalyst bed of porous zeolite hydrodewaxing catalyst particles while permitting the gaseous phase to flow directly to the succeeding catalyst bed;

recycling a quantity of treated oil collected below a catalyst bed and reapplying the treated oil at a preceding redistribution zone above the bed from which treated oil is collected, whereby the total of oil feed flow rate and recycled treated oil flow rate is maintained at sufficient liquid flux rate to effect substantially uniform catalyst wetting, thereby enhancing hydrodewaxing conversion.

2. The process of claim 1 comprising the further steps of measuring the feed rate of the oil feed, comparing the feed rate with a total design flow rate and increasing recycle of treated oil in at least one bed so that the total of the feed rate and recycle rate is maintained substantially equal to the design bed flux rate.

3. The process of claim 1 wherein recycle treated oil is heat exchanged to control the temperature of reactants entering a catalyst bed independently of the temperature in a preceding or subsequent catalyst bed.

4. The process of claim 1 wherein gas and liquid are separated at the outlet of a catalyst bed and a portion of the gas is passed to the inlet of a preceding catalyst bed.

5. The process of claim 1 wherein a wax-containing lubricant oil feedstock is hydrodewaxed at elevated temperature in contact with at least two beds of medium pore siliceous zeolite hydrodewaxing catalyst.

6. A continuous process for treating a wax-containing lubricant range petroleum oil in a multi-phase fixed bed catalytic reactor system having at least two catalyst hydrodewaxing beds, comprising the steps of feeding the oil and hydrogen-containing gas at feed flow rates above a first horizontal porous bed of acid hydrodewaxing catalyst particles at elevated temperature under hydrodewaxing conditions for concurrent downward flow therethrough;

collecting and withdrawing the treated oil from the first bed and redistributing at least a portion of the treated oil to at least one succeeding horizontal porous catalyst bed of acid hydrodewaxing catalyst particles while permitting withdrawn gaseous phase produced in said first bed to flow directly to a succeeding catalyst bed;

recycling a quantity of treated oil collected below a catalyst bed to a preceding redistribution zone above the bed from which treated oil is collected;

measuring the rate of oil feed, comparing the oil feed rate with a total design flow rate; and adjusting recycle of treated oil in at least one bed, whereby the total of oil feed rate and recycled treated oil flow rate in at least one bed, is maintained at a liquid flux rate sufficient to provide catalyst wetting.

* * * * *